US010172191B2

(12) United States Patent
Nesensohn et al.

(10) Patent No.: US 10,172,191 B2
(45) Date of Patent: Jan. 1, 2019

(54) DRIVER CIRCUIT WITH LLC START-UP CONTROL

(71) Applicant: TRIDONIC GMBH & CO KG, Dornbirn (AT)

(72) Inventors: Christian Nesensohn, Gotzis (AT); Manuel Egle, Hohenems (AT)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 15/522,356

(22) PCT Filed: Nov. 23, 2015

(86) PCT No.: PCT/EP2015/077345
§ 371 (c)(1),
(2) Date: Apr. 27, 2017

(87) PCT Pub. No.: WO2016/091568
PCT Pub. Date: Jun. 16, 2016

(65) Prior Publication Data
US 2017/0325299 A1    Nov. 9, 2017

(30) Foreign Application Priority Data

Dec. 11, 2014  (DE) .................. 10 2014 225 600

(51) Int. Cl.
*H05B 33/08* (2006.01)
*H02M 1/00* (2006.01)
(52) U.S. Cl.
CPC . *H05B 33/0809* (2013.01); *H02M 2001/0058* (2013.01); *Y02B 70/1491* (2013.01)
(58) Field of Classification Search
CPC ............ H05B 33/0809; H05B 33/0815; H05B 33/0884; H05B 33/0842; H05B 37/0281;
(Continued)

(56) References Cited

U.S. PATENT DOCUMENTS 6,097,160 A    8/2000  Seiler
2010/0270949 A1  10/2010  Onishi et al.
(Continued)

FOREIGN PATENT DOCUMENTS

DE   102010031233   9/2011
WO   2010115976    10/2010
WO   2013092656    6/2013

OTHER PUBLICATIONS

AN-9729, "LED Application Design Guide Using Half-Bridge LLC Resonant Converter for 100W Street Lighting", Internet citation https://www.fairchildsemi.com/application-notes/AN/AN-9729.pdf, printed Apr. 18, 2017.
(Continued)

*Primary Examiner* — Tung X Le
*Assistant Examiner* — Henry Luong
(74) *Attorney, Agent, or Firm* — Andrus Intellectual Property Law

(57) ABSTRACT

A driver circuit is provided for lighting means, in particular for one or more LEDs, having an LLC circuit with an inverter which is clocked by means of at least two switches and is designed to supply a resonant circuit, wherein the resonant circuit is coupled to a primary winding of a transformer for transforming electrical energy from the primary winding to a secondary winding, and the lighting means can be supplied with current starting from the secondary winding, having a control unit which is designed to control the switch of the inverter after an activation of the driver circuit during a start phase, in such a way that after a single or after multiple alternating cycles of the switch, the cycling of the switch is suspended for the duration of at least one alternating cycling of the switch until a criterion for ending the start phase is satisfied.

12 Claims, 3 Drawing Sheets

(58) Field of Classification Search
CPC ... H02M 2001/0058; H02M 2001/385; H02M 2001/0096; Y02B 20/348
See application file for complete search history.

(56) References Cited

U.S. PATENT DOCUMENTS

| | | |
|---|---|---|
| 2011/0164437 A1 | 7/2011 | Sun et al. |
| 2012/0176816 A1* | 7/2012 | Seel ........................ H02M 1/36 363/21.01 |
| 2013/0200707 A1* | 8/2013 | Hartmann ................. H02J 9/02 307/39 |
| 2013/0271040 A1 | 10/2013 | Chen et al. |
| 2014/0232282 A1* | 8/2014 | Rooijackers ...... H02M 3/33523 315/200 R |
| 2014/0361698 A1 | 12/2014 | Pereira |
| 2016/0057825 A1* | 2/2016 | Hu .................... H05B 33/0815 315/201 |
| 2016/0099639 A1* | 4/2016 | Leisten ............... H02M 3/3376 323/271 |

OTHER PUBLICATIONS

German search report dated Jun. 24, 2015 in parent German Application 10 2014 225 600.3.
International Search Report dated Feb. 24, 2016 in parent PCT Application PCT/EP2015/077345.

* cited by examiner

DRIVER CIRCUIT WITH LLC START-UP CONTROL

CROSS REFERENCE TO RELATED APPLICATION

The present application is the U.S. national stage application of International Application PCT/EP2015/077345, filed Nov. 23, 2015, which international application was published on Jun. 16, 2016 as International Publication WO 2016/091568 A1. The International Application claims priority to German Patent Application 10 2014 225 600.3, filed Dec. 11, 2014.

FIELD OF THE INVENTION

The invention relates to a driver circuit for the operation of at least one lighting means, in particular for at least one LED, to a light fixture with such a driver circuit as well as to a method to operate the driver circuit.

BACKGROUND OF THE INVENTION

Driver circuits are generally known from the state of the art for operating lighting means, in particular LEDs. A known driver circuit is supplied from an electrical supply, e.g. from an alternating voltage and particularly a mains voltage, and comprises a resonant circuit that is part of an LLC circuit, for example. A transformer is provided for transforming electrical energy across a galvanic barrier, from a primary side of the transformer or the driver circuit to a secondary side of the transformer or the driver circuit. The galvanic barrier therefore essentially divides the driver circuit into a primary side supplied from the electrical supply and a secondary side supplied from the secondary side of the transformer. The goal of the energy transfer is typically to supply the lighting means on the secondary side, particularly with an operating current. The LLC circuit preferably has two windings/spools of which one functions as the primary winding of the transformer, hereinafter also referred to as LLC transformer.

With the known driver circuits, there is however a problem when switching on the driver circuit, that the LLC circuit and thus the LLC transformer as a whole is started with a high frequency of 200 kHz, for example. With this high frequency, it can happen that the output voltage of the LLC transformer is so high that the voltage resulting on the lighting means exceeds the maximum voltage permissible for the lighting means. It can thus result in such an undesired voltage on the output of the driver circuit directly after starting the driver circuit and thus during the startup of the transformer due to a power curve of the resonant transformer. With a lighting means that has a relatively low breakdown voltage, such as with an LED, such a noticeable flash of light can be generated when turning on the driver circuit or during the startup of the LLC transformer, which constitutes an undesirable behavior for the user. It is also possible that the lighting means is damaged or destroyed as correspondingly high current flows through the lighting means.

SUMMARY OF THE INVENTION

It is therefore the task of the invention, after the activation of the driver circuit, to adjust the output voltage or the voltage applied to the lighting means in such a way that the listed negative effects don't occur. The invention offers the option, in particular, to provide a respective control after the activation of the driver circuit, during a start phase of the driver circuit or of the lighting means operation. With the procedure per the invention, exceeding permissible operating parameters of the lighting means can be avoided.

To solve the problem, the invention provides a driver circuit, a lighting fixture, and a procedure to operate the driver circuit.

In a first aspect, a driver circuit is provided for at least one lighting means, particularly for one or more LEDs. The driver circuit includes: an LLC circuit with an inverter, which is clocked by means of at least two switches, configured to supply a resonant circuit with a primary winding of a transformer for transforming electrical energy from the primary winding to a secondary winding. The lighting means can be supplied with current starting from the secondary winding. A control unit which is configured to control the switch of the inverter after activation of the driver circuit in such a way that after a single or multiple alternating cycles of the switch, the cycling of the switch is suspended for the duration of at least one alternating cycling of the switch until a criterion for ending the start phase is satisfied.

After the duration of the suspension, a new alternating cycled control of the switches (LS, HS) can take place, preferably directly and immediately after the duration of the suspension.

Upon completion of the start phase, the control unit can control the switches of the inverter in a normal operation by continuously cycling the switches.

The control unit can control the switches of the inverter in a burst and/or in pulse-width modulation operation.

The driver circuit can have a power factor correction circuit that can supply the The control unit can change an operating mode of the power factor correction circuit, for example by changing the target output voltage of the power factor correction circuit and/or a manipulation of a return of a signal fed back from the power factor correction switch, see arrow 5A in FIG. 1.

The control unit can reduce a voltage applied to the lighting means by changing the control of the switch of the inverter and/or changing the operating mode of the power factor correction switch.

Originating from the secondary winding, a rectifier and/or a filter, particularly a ripple filter, can be installed upstream from the lighting means.

In normal operation, the LLC circuit can be settled, whereby in normal operation, the frequency of the cycling of the switches of the inverter can be a manipulated variable, and whereby a frequency regulation can be deactivated in the initial operation.

The criterion may be a number of switch cycles and/or a certain duration following activation and/or a value of a feedback variable fed back from the control unit.

The feedback variable can be a voltage and/or a current or a parameter reproducing such.

The control unit can receive a signal feeding back the current through the LLC circuit, and/or a signal fed back as a feedback variable reproducing the voltage applied to the primary winding and/or on a secondary side of the transformer applied to the lighting means.

A lighting fixture is provided in a further aspect, comprising an LED set and a driver circuit as is described above to supply the LED set with current.

In yet another aspect, a method is described to operate at least one lighting means, in particular at least one LED. The method involves providing an LLC circuit with an inverter which is clocked by means of at least two switches and is configured to supply a resonant circuit, wherein the resonant circuit is coupled to a primary winding of a transformer for transforming electrical energy from the primary winding to a secondary winding. The lighting means can be supplied with current starting from the secondary winding. The method also involves providing a control unit and using the control unit to control the switches of the inverter after an activation of the driver circuit during a start phase, wherein after a single or after multiple alternating cycles of the switch, the cycling of the switch is suspended for the duration of at least one alternating cycling of the switch until a criterion for ending the start phase is satisfied.

BRIEF DESCRIPTION OF THE DRAWINGS

The invention is now also described with a view to the figures. The following is thereby shown in.

DETAILED DESCRIPTION

Figure 1:
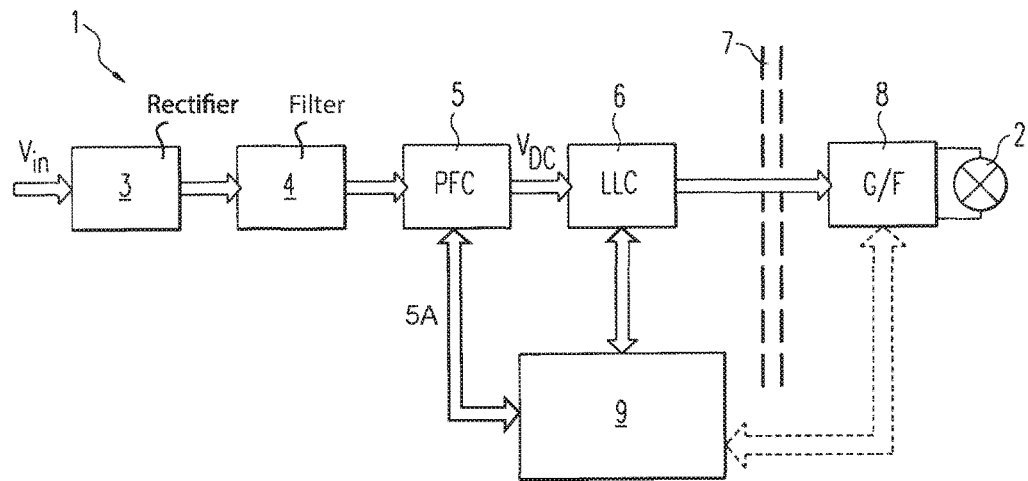
FIG. 1 schematically illustrates the design of a driver circuit per the invention for supplying a driver circuit.

To solve the problem underlying the invention, it is intended that the LLC circuit is controlled in a special manner during a defined start phase. At least two switches of a clocked inverter are controlled by a control unit to cycle the inverter. The inverter is thereby equipped to supply a resonant circuit of the LLC circuit. The LLC circuit is consequently controlled by controlling the at least two switches of the inverter, particularly a half-bridge inverter.

In accordance with the invention, in the starting phase, the at least two switches of the inverter are controlled alternating at least once, and after the single or repeated alternating cycle, the switch is suspended for the period of at least one alternating cycle of the switch. A number of cycles can thus be specified, in particular, during which the switches are operated alternating (a cycle is understood as an alternating control of the at least two switches). On the other hand, an additional number of cycles can be specified, during which there is no control of the at least two switches.

It is possible to supply information to the control unit which controls the at least two cycled switches for operating the lighting means at the output of the driver circuit. Adjustment possibilities can be provided on the driver circuit or on an operating device comprising them. For example, provision may be made for supplying information about the connected lighting means through an adjustable or interchangeable resistor of the driver circuit. The driver circuit may also be set-up to perform measurements before or during the start phase or to evaluate signals supplied to it, which allow for information about the connected lighting means. The duration of the start phase can also be fixed, or can be defined over one or several cycles or a duration, or can be defined adaptively by means of a feedback variable such as a voltage or a current or by a parameter reflecting these. The feedback variable can thereby be recorded by the control unit on the primary side and/or the secondary side of the driver circuit.

During the start phase, according to a central aspect of the invention, the operation of the LLC transformer is performed "burst"-like or in a pulse width modulation operation (PWM operation), in which at least the period between two alternating cycles of the at least two switches of the LLC circuit of the inverter is adjustable. After one or several switch cycles or after one or several alternating controls of the at least two switches of the LLC circuit, one switch cycle but preferably several switch cycles are omitted before cycled control of the at least two switches takes place anew.

This control by the control unit has the advantage that the voltage above the lighting means is built up slower and that a flash of light or damage to the lighting means due to too high of a current/too high of a voltage is prevented. The "burst" operation thereby describes an operation during which the switches of the cycled inverter or the LLC circuit are controlled alternately through a certain number of switch cycles, while this is followed by a predetermined period during which there is no control or during which the switches of the inverter are deactivated or are not switched conductive.

The method described above for lowering the output voltage or the voltage provided for the lighting means during the start phase can be supplemented by specifically altering the operating mode of a power factor correction circuit (PFC circuit). The power factor correction circuit supplies the inverter. An output voltage (target output voltage) is typically specified for the power factor correction circuit, which must be set at the output of the power factor correction switch. Accordingly, the voltage/power output by the power factor correction circuit can be adjusted/changed by changing its target output voltage or by manipulation of a variable supplied to the PFC circuit that reproduces the output voltage (as actual voltage) and that is used by the power factor correction circuit to adjust the output voltage supplied by it.

As a reduction of the voltage applied to the lighting means can be done by adjusting the operating mode of the power factor correction circuit, it must be observed that the change of the operating mode of the power factor correction circuit alone is generally not sufficient to adequately reduce the voltage supplied to the lighting means and thus of the current flowing through the lighting means to prevent the adverse effects (flash of light, (partial) destruction of the lighting means). Provision is therefore made according to the invention to combine the control of the switches of the LLC circuit with the decrease of the output voltage of the power factor correction circuit or the input voltage of the LLC circuit. Both aspects can, however, be used separately overall to achieve the objective per the invention.

As already stated, the operation of the lighting means is powered by the supply of electricity originating from the LLC circuit. It must thereby be understood that the secondary winding of the transformer can further supply passive and/or active downstream circuit elements which are upstream from the lighting means. These circuit elements can be an AC/DC converter, a rectifier, and/or a filter, particularly a ripple filter, for example. Consequently a load, particularly from secondary side switching elements can also be achieved in the initial phase using the abovementioned measures. Thus, components used there an inductor of the filter/ripple filter can thus be relieved as the in-rush currents that are present are reduced accordingly. As a result, the lifetime of the driver circuit can thus be increased overall.

Once the start phase has ended, meaning after a criterion has been fulfilled, for example, which signifies the end of the start phase (e.g. the expiry of a specific period following the activation of the driver circuit or a number of cycles during which the switches have been activated, are therefore controlled alternately, or have been deactivated), the driver circuit changes from the operation of the start phase to a normal operation. In this normal operation, the LLC circuit is in a settled state and the frequency of the cycling of the inverter circuits serves as the manipulated variable. This frequency regulation is deactivated during the start phase.

FIG. 1 shows a schematic view of the design of a driver circuit 1 for operating a lighting means 2, particularly of an LED set with at least one LED. The LEDs of the LED set can be arranged in series, in parallel or in a series/parallel circuit.

The driver circuit 1 is preferably supplied by an input voltage $V_{in}$, e.g. in the form of an alternating voltage originating from the mains voltage. On the input side of the driver circuit 1, the input voltage $V_{in}$ is preferably fed to a rectifier 3 and/or a filter (e.g. an EMI filter, electromagnetic interference filter) 4 which filters out electromagnetic disturbances.

The rectified and possibly filtered input voltage of the driver circuit 1 is then preferably fed to a power factor correction circuit (PFC) 5 that generates a supply voltage $V_{DC}$ on the output site, a bus voltage, in particular. The supply voltage $V_{DC}$ is preferably a DC voltage or an approximate constant bus voltage that possibly has a residual ripple. The supply voltage $V_{DC}$ can be a DC voltage of 400 V, for example.

Alternately, the supply voltage $V_{DC}$ can also be a DC voltage or a constant voltage such as a battery voltage, for example. In this case, the rectifier 3, the optional filter 4, and/or the power factor correction circuit 5 can be done without.

The supply voltage $V_{DC}$ supplies an LLC circuit 6. The LLC circuit 6 is thereby preferably an DC/AC converter. The LLC circuit 6 comprises a resonant circuit (LLC resonant circuit), whereby an inductance of the LLC circuit servers as the primary winding for the transformer.

The transformer provides current through a galvanic barrier 7 from a primary side of the transformer to a secondary side of the transformer. The LLC circuit 6 is therefore a clocked converter, in which the LLC resonant circuit is supplied from at least two switches originating from an inverter. On the secondary side of the galvanically separating barrier 7, an AC/DC converter 8 and particularly a rectifier are shown which can however still comprise other components, such as the filter. The switches are controlled by a control unit 9 that, preferably alternating turns the switches on, meaning into their conductive state, or off, meaning into their non-conducting state accordingly. The secondary side of the transformer supplies one load and the lighting means 2, in particular.

The galvanic barrier 7 can be a SELV barrier (safety extra-low voltage barrier), and is overcome by the transformer of the LLC circuit 6, whereby the transformer of the LLC circuit can especially be designed as a transformer. The transmission of electrical energy from the primary side to the secondary side of the transformer across the galvanic barrier is also controlled or regulated by means of the control unit 9 via control of the switches.

The control unit 9 is preferably arranged on the primary side of the galvanic barrier, but can also be arranged on the secondary side. To adjust the desired current through the lighting means 2, an electrical value is measured on the primary side (double arrow) and/or on the secondary side (double arrow dotted) and fed back to the control unit 9. On the basis of these returned values, the control unit 9 then controls the inverter or the switches of the inverter of the LLC circuit 6 such that the desired current flows through the lighting means. The control unit ensures that the load in the form of a light source, particularly in the form of the LED set is supplied with the desired current.

Figure 2:
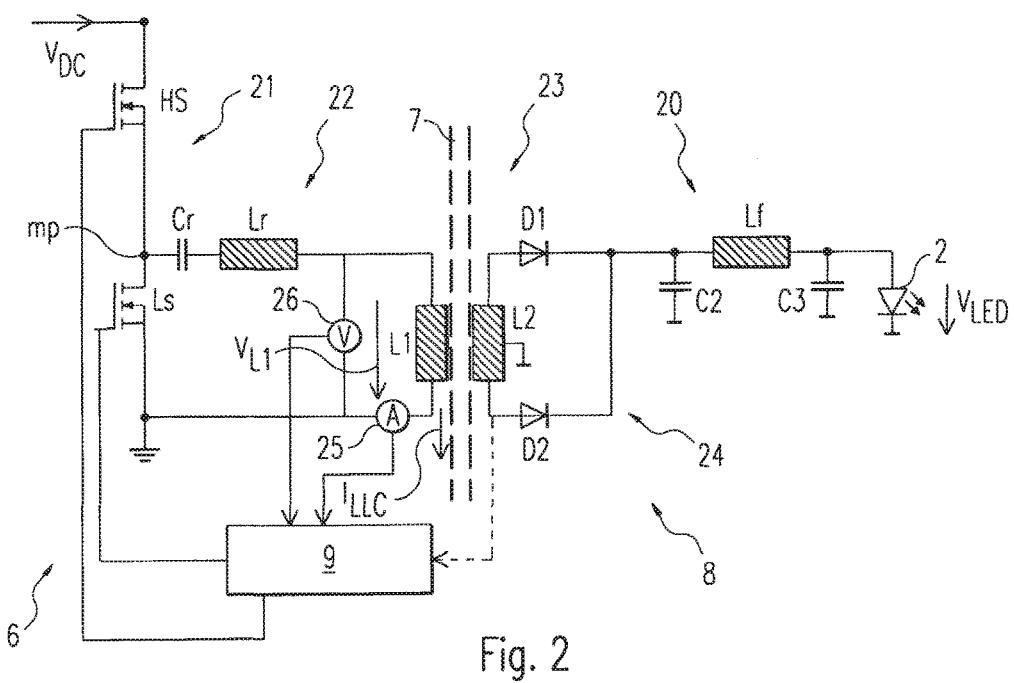
FIG. 2 illustrates an exemplary embodiment of the components of a driver circuit according to the invention.

FIG. 2 shows an exemplary embodiment of the LLC circuit 6 to supply current to the lighting means 2, shown here as an LED. FIG. 2 also shows an exemplary embodiment of the AC/DC converter 8 from FIG. 1 and a filter 20 downstream from it. As shown in FIG. 1, the supply voltage $V_{DC}$ supplies the LLC circuit 6 of the driver circuit 1. A clocked inverter is provided for in the LLC circuit on the input side. An inverter in the form of a half-bridge inverter 21 is shown in FIG. 2, for example. The half-bridge inverter 21 is supplied by the supply voltage $V_{DC}$ and preferably has a lower potential switch LS and a higher-potential switch HS. It should be understand that the clocked circuit has at least one switch. A flyback converter can be used as an inverter with a switch, for example.

The switches LS, HS of the half-bridge circuit 21 can be designed as transistors, e.g. FET or MOSFET. The switches LS, HS can be controlled by means of control signals that are transmitted by the control unit 9. The lower-potential switch LS is connected to a primary ground. The input voltage $V_{DC}$ is however applied to the higher-potential switch HS of the half-bridge circuit 21.

On the midpoint mp of the half-bridge circuit 21, meaning between the two switches LS, HS, the resonant circuit 22 is connected in the form of a series resonant circuit, consisting of a resonant capacitor Cr and a resonant inductance Lr. A winding L1 is additionally placed in the resonant circuit. Alternately, according to the invention, a parallel resonant circuit can also be connected on the midpoint mp of the half-bridge circuit. The resonant circuit 22 is placed between the primary ground and the midpoint mp of the half-bridge circuit. The resonant circuit 22 in this case is referred to as LLC resonant circuit. The resonant capacitor Cr and the resonant inductance Lr preferably form an LC resonant circuit.

The coil L1 is preferably the primary winding of the transformer 23. The transformer shown in FIG. 2 comprises the primary winding L1, i.e., the winding L1 of the LLC resonant circuit, and a secondary winding L2 electromagnetically coupled with this primary winding L1. Through the transformational coupling between the winding L1 and the secondary winding L2, energy transmission takes place across the galvanic barrier 7 when the transformer is controlled accordingly, particularly through the control of the cycling of the switches HS, LS by means of the control unit 9. The transformer 23 can additionally also have a stray inductance and a main inductance (not shown. The stray inductance may be provided in series with the winding L1. The main inductance conducts the magnetizing current and is preferably disposed in parallel to the winding L1.

During operation, an alternating current (AC current) preferably flows through the secondary winding L2 of the transformer. The voltage of the secondary winding L2 is then preferably fed to a rectifier 24 that is formed through the diodes D1 and D2 in the example shown. The secondary winding L2 of the transformer 23 additionally has a tapping or extractor that is preferably a midpoint tapping. This midpoint tapping forms a potential of the rectifier 24 or a potential of the voltage $V_{LED}$ applied to the LED set.

One side of the secondary winding L2 is connected with an anode of the first diode D1, while the other side of the secondary winding L2 is connected with the anode of the second diode D2. The respective cathodes of the diodes D1, D2 are joined and form an output potential of the rectifier 24. The rectifier 24 can be coupled with a storage capacitor or filter capacitor C2 on the output side. An electrolytic capacitor (ELKO) can be used as the storage capacitor, in particular.

In order to filter a voltage output by the rectifier 24, and to especially provide ripple filtering, an inductor Lf is located downstream from the capacitor C2. The inductor Lf in turn is connected with another capacitor C3. The capacitors C2 and C3 are connected with the inductance Lf on their potential higher side, while they are connected with the secondary ground on their potential lower side. The secondary ground potential may differ from the primary ground potential.

On the primary side of the LLC circuit shown in FIG. 2, means 25 can be provided to measure the primary current or the current through the resonant circuit 22. The means 25 for measuring the current $I_{LLC}$ through the resonant circuit 22 is preferably a measuring resistor (shunt). The measuring resistor can be connected in series to the winding L1 of the transformer in the usual way. When an applied voltage is recorded on the measuring resistor by means of the control unit 9, the control unit 9 is able to record the current through the resonant circuit 22. Accordingly, the control unit 9 can thus control of the switches LS, HS of the half-bridge 21.

Means 26 to measure the voltage $V_{L1}$ through the primary winding L1 can also be located on the primary side of the LLC circuit. According to one embodiment, voltage measurement can be accomplished such that both sides of the primary winding L1 are connected with the control unit 9 so that it can record the voltage across the inductor L1. The control unit 9 can therefore access direct information about the voltage $V_{L1}$ applied to the winding L1 overall. Alternately, a voltage divider (not shown) can be placed between the connections of the winding L1 and a partial voltage of the voltage divider can be supplied to the control unit 9 accordingly, which can then reproduce a voltage $V_{L1}$ supplied to the winding L1 as an actual signal for the voltage.

Provision may naturally also be made for that the control unit 9, on the secondary side of the circuit shown in FIG. 2, in order to record a parameter that reproduces the current and/or the voltage on the secondary side. The parameter can be returned through a resistance circuit or a capacitor circuit through the galvanic barrier, for example. The control unit 9 can thus particularly record a voltage or a current transferred to the secondary side. A control of the switches LS, HS of the half-bridge 21 through the control unit 9 may be done based on these signals as well (see indication through the dotted arrow in FIG. 2).

As already stated, according to the invention, during the start phase, meaning following the activation of the driver circuit, a control of the inverter circuit is executed in such a way that a pause takes place after one or several alternating controls of the switches which is at least as long as the duration necessary for the alternating control of the switches.

Figure 3:
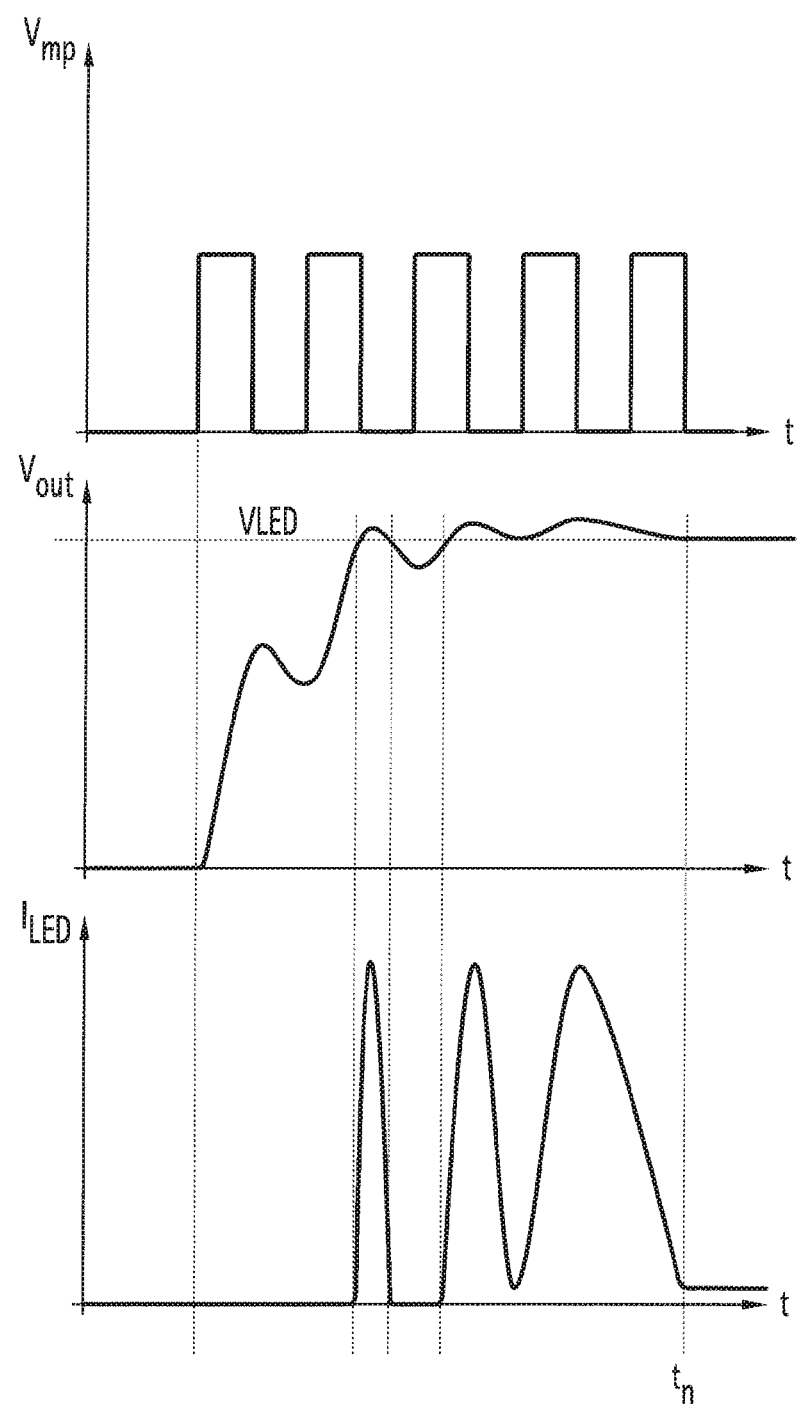
FIG. 3 shows exemplary signal paths of different measured values of a driver circuit without the solution per the invention.

FIG. 3 shows in a schematic diagram, the behavior of the lighting means current $I_{LED}$ and the voltage $V_{OUT}$ output to the lighting means, if control of the switches of the inverter is not done according to the invention. The top curve of FIG. 3 represents the voltage $V_{mp}$ captured at the midpoint mp of the half-bridge, which is the result of a uniform PWM control of the switches LS, HS through the control unit 9.

The maximum permissible voltage $V_{LED}$ for the lighting means is marked in the middle diagram. It can clearly be seen that the voltage $V_{OUT}$ builds up with a uniform cycling of the inverter circuit 21 and that it overshoots the maximum permissible lighting means voltage $V_{LED}$ in some areas. Accordingly, it can be seen in the lower diagram that an extremely amplified current can be measured passing through the lighting means $I_{LED}$. The current that would actually be set at the lighting means and the output voltage $V_{OUT}$ to be set can be seen after the time $t_n$, which marks the beginning of the normal operation.

Figure 4:
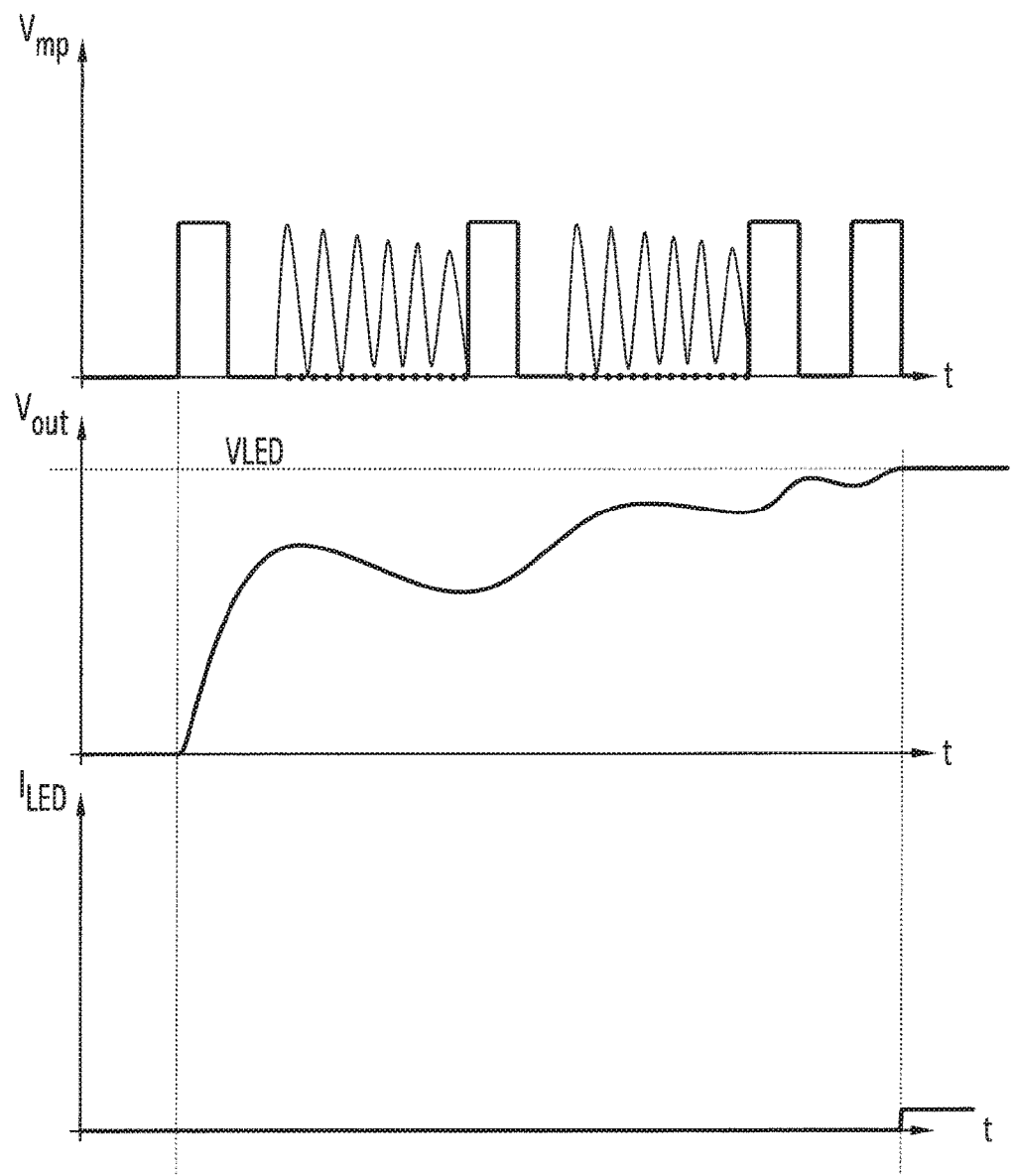
FIG. 4 shows exemplary signal paths of different measured values of a driver circuit according to the invention.

Accordingly, FIG. 4 shows in a schematic view what the effect is of controlling the switches of the inverter 21 according to the invention. Control of the switches is shown in the top diagram, whereby a new switch-on initially only takes place according to a switch-on cycle, when no cycling has taken place for a duration of three cycles. The voltage $V_{mp}$ measured on the midpoint mp thereby also shows the fluctuation of the voltage resulting from the oscillation of the resonant circuit. It can clearly be seen that the output voltage $V_{OUT}$ increases much slower in the middle diagram and that the LLC circuit is thus charged more slowly. It can also be seen that the output voltage $V_{OUT}$ does not exceed the permissible operating voltage for the lighting means $V_{LED}$. It does not result in a flash of light insofar and the lighting means is not damaged either.

It furthermore shows in the lower diagram of FIG. 4 that it doesn't result in a current breakthrough on the lighting means. As the output voltage on the lighting means approaches the permissible voltage $V_{LED}$ for the lighting means relatively slowly, an increase of the current through the lighting means as is intended for operation, is only done after the time $t_n$. After the voltage to be adjusted on the lighting means has been reached, the start phase has ended and the control unit will control the switches of the inverter in normal operation in accordance with a frequency control.

With a combination of the decrease of the bus voltage, meaning the input voltage of the LLC circuit 6 or the output voltage of the power factor correction circuit 5, and a PWM or burst operation, the voltage $V_{OUT}$ can slowly be increased nominally to the desired voltage VLED, when the bus voltage $V_{DC}$ is slowly increased to the target value based on a reduced amplitude.

The PWM operation with blocked frequency regulation is thus cancelled in the area, in which the bus voltage reaches the nominal value, and the frequency regulation of the normal operation can be used. The regulation of the voltage supplied to the lighting means in the start phase is therefore a closed control loop (closed-loop).

What is claimed is:

1. A driver circuit for at least one lighting means comprising one or more LEDs, the driver circuit comprising:
    an LLC circuit with a clocked inverter comprising a high potential switch and a low potential switch connected in series, wherein the high potential switch is connected to a DC voltage source and the low potential switch is connected to ground and a midpoint between the high potential switch and the low potential switch is configured to supply a resonant circuit, wherein the resonant circuit is coupled to a primary winding of a transformer for transforming electrical energy from the primary winding to a secondary winding, and the at least one lighting means are supplied with rectified current starting from the secondary winding, and
    a control unit configured to control the high potential switch and the low potential switch of the clocked inverter by alternating cycles of the high and low potential switches after an activation of the driver circuit during a start phase, and wherein during the start phase after a single or after multiple alternating cycles of the high potential switch and the low potential switch, cycling of the high potential switch and the low potential switch is suspended for a duration of at least one alternating cycle of the high potential switch and the low potential switch until a criterion for ending the start phase is satisfied, said criterion being one of a number of switch cycles, a specific period of time after the activation, and a value of a feedback variable fed back to the control unit;

wherein after ending the start phase the control unit is configured to control the high potential switch and the low potential switch of the clocked inverter in normal operation mode to continuously cycle the high potential switch and the low potential switch, and a frequency of the alternating cycles of the high potential switch and the low potential switch of the clocked inverter is a manipulated variable in the normal operation mode, and frequency control is deactivated during the start phase.

2. The driver circuit according to claim 1, whereby a new alternating cycled control of the high potential switch and the low potential switch takes place after the duration of the suspension.

3. The driver circuit according to claim 1, whereby the control unit is configured to control the high potential switch and the low potential switch of the inverter in a burst and/or pulse width modulation operation during the normal operation mode.

4. The driver circuit according to claim 1, whereby the driver circuit has a power factor correction circuit that is configured to supply the clocked inverter with electricity.

5. The driver circuit according to claim 4, whereby the control unit is configured to change an operating mode of the power factor correction circuit for the start phase, through a change of a target output voltage of the power factor correction circuit and/or a manipulation of a return of a signal fed back from a power factor correction switch.

6. The driver circuit according to claim 1, whereby the control unit is configured to reduce a voltage supplying the at least one lighting means through a change of the control of the high potential switch and the low potential switch of the clocked inverter.

7. The driver circuit according to claim 1, whereby starting from the secondary winding a rectifier and a ripple filter are located upstream of the at least one lighting means.

8. The driver circuit according to claim 1, whereby the feedback variable is a voltage and/or a current or a parameter representing voltage and/or current.

9. The driver circuit according to claim 1, whereby a signal reproduced through the LLC circuit, and/or a signal reproducing a voltage applied to the primary winding and/or on the secondary winding of the transformer, is fed back to the control unit as the feedback variable.

10. A lighting fixture, having an LED set and the driver circuit according to claim 1 to supply the lighting fixture with electricity.

11. A method for operating at least one lighting means comprising at least one LED, the method comprising the steps of:

providing an LLC circuit (6) a clocked inverter comprising a high potential switch and a low potential switch connected in series, wherein the high potential switch is connected to a DC voltage source and the low potential switch is connected to ground and a midpoint between the high potential switch and the low potential switch is configured to supply a resonant circuit, wherein the resonant circuit is coupled to a primary winding of a transformer for transforming electrical energy from the primary winding to a secondary winding, and the at least one lighting means can be supplied with current starting from the secondary winding, providing a control unit;

using the control unit to control the high potential switch and the low potential switch of the clocked inverter after an activation of the driver circuit during a start phase, wherein after a single or after multiple alternating cycles of the high potential switch and the low potential switch, cycling of the high potential switch and the low potential switch is suspended for a duration of at least one alternating cycle of the high potential switch and the low potential switch until a criterion for ending the start phase is satisfied, said criterion being one of a number of switch cycles, a specific period of time after the activation, and a value of a feedback variable fed back to the control unit; and after ending the start phase, using the control unit to control the high potential switch and the low potential switch of the clocked inverter in normal operation mode to continuously cycle the high potential switch and the low potential switch with a frequency of the alternating cycles of the high potential switch and the low potential switch of the clocked inverter being a manipulated variable in the normal operation mode, wherein frequency control is deactivated during the start phase.

12. The method according to claim 11, whereby a new alternating cycling of the high potential switch and the low potential switch takes place after the duration of the suspension.

* * * * *